United States Patent
Tobinaga et al.

(10) Patent No.: US 6,949,285 B1
(45) Date of Patent: Sep. 27, 2005

(54) MEMBRANE SUITABLE FOR ELECTROCHEMICAL CELLS

(75) Inventors: Tekeshi Tobinaga, Yokkaichi (JP); Klemens Mathauer, Ludwigshafen (DE); Bernd Bronstert, Otterstadt (DE); Helmut Möhwald, Annweiler (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/857,031

(22) PCT Filed: Dec. 2, 1999

(86) PCT No.: PCT/EP99/09420

§ 371 (c)(1),
(2), (4) Date: May 31, 2001

(87) PCT Pub. No.: WO00/33406

PCT Pub. Date: Jun. 8, 2000

(30) Foreign Application Priority Data

Dec. 3, 1998 (DE) .................................. 198 55 889

(51) Int. Cl.[7] ........................ B01D 71/54; B32B 27/20; B32B 27/40; C08L 75/04; H01M 2/16
(52) U.S. Cl. .................. 428/317.9; 428/323; 428/324; 428/330; 429/251; 429/252; 429/254
(58) Field of Search ................ 429/248, 249, 429/251, 254, 252; 428/304.4, 308.4, 317.9, 428/323, 324, 325, 327–331, 423.1; 252/62.2

(56) References Cited

U.S. PATENT DOCUMENTS

| | | | |
|---|---|---|---|
| 5,346,788 A | * | 9/1994 | Chang et al. ............... 429/249 |
| 5,478,668 A | | 12/1995 | Gozdz |
| 5,540,741 A | | 7/1996 | Gozdz |
| 5,603,982 A | | 2/1997 | Sun |
| 5,609,974 A | | 3/1997 | Sun |
| 6,001,464 A | * | 12/1999 | Schultze et al. ............ 428/220 |
| 6,096,456 A | * | 8/2000 | Takeuchi et al. ............ 429/249 |

FOREIGN PATENT DOCUMENTS

| | | | |
|---|---|---|---|
| DE | 196 12769 | | 10/1997 |
| EP | 591 782 | | 4/1994 |
| EP | 708 454 | | 4/1996 |
| JP | 8-59981 | * | 3/1996 |
| WO | 88/03154 | | 5/1988 |
| WO | 95/10860 | | 4/1995 |
| WO | 96/03781 | | 2/1996 |

OTHER PUBLICATIONS

Van Krevelen, D.W., Properties of Polymers: Their Estimation and Correlation with Chemical Structure, 2nd ed., Elsevier, 1976, pp. 99-127.*
Derwent Abstract JP 05021050, Jan. 1993.
Abstract, DE 19 612769-A1, Oct. 1997.
Patent Abst.of Japan 08059981, Mar. 1996.
Ullmann's Encyclopedia of Industrial Chemistry Fifth Edition, vol. A3, pp. 343-397, 1985.

* cited by examiner

Primary Examiner—Jonathan Crepeau
(74) Attorney, Agent, or Firm—Novak Druce & Quigg LLP; Jason D. Voight

(57) ABSTRACT

A membrane comprising a composition including
(a) 1 to 99 wt-% of at least one polyurethane elastomer comprising at least one hard segment and at least one soft segment, and
(b) 99 to 1 wt-% of a solid,
wherein said solid is incorporated in said at least one polyurethane elastomer.

6 Claims, No Drawings

MEMBRANE SUITABLE FOR ELECTROCHEMICAL CELLS

The present invention relates to a membrane comprising a composition including at least one thermoplastic polyurethane elastomer and incorporated therein a solid, a composite comprising said membrane, an electrochemical cell comprising either said membrane or said composite and generally the use of said membrane as a separator in electrochemical cells.

Electrochemical cells, in particular those which are rechargeable, are well known, for example from Ullmann's Encyclopedia of Industrial Chemistry, 5th ed., Vol. A3, VCH Verlagsgesellschaft mbH, Weinheim, 1985., pages 343–397.

Due to their high specific energy storage density, lithium batteries and lithium ion batteries occupy a particular position among these cells, especially as secondary cells.

As described, inter alia, in the above extract from "Ullmann", the cathodes of such cells contain lithiated compound oxides of manganese, cobalt, vanadium or nickel; these may be described in the stoichiometrically simplest case as $LiMn_2O_4$, $LiCoO_2$, $LiV_2O_5$ or $LiNiO_2$.

These compound oxides react reversibly with substances, such as graphite, which are capable of incorporating lithium ions into their lattice, the lithium ions being removed from the crystal lattice and the metal ions within this, such as manganese, cobalt or nickel ions, being oxidized. In an electrochemical cell this reaction can be used to store electrical energy by separating the compound accepting lithium ions, i.e. the anode material, from the lithium-containing compound oxide, i.e. the cathode material, by means of an electrolyte through which the lithium ions from the compound oxide can migrate into the anode material (charging).

The compounds suitable for reversible storage of lithium ions are usually secured to collector electrodes by means of a binder.

During charging of the cell, electrons flow through an external voltage source and lithium cations through the electrolyte toward the anode material. When the cell is used, the lithium cations flow through the electrolyte, but the electrons flow from the anode material to the cathode material through a load.

In order to avoid a short circuit within the electrochemical cell, a layer which is electrically insulating but permeable to lithium cations is located between the two electrodes. This may be what is known as a solid electrolyte or a conventional separator.

In the production of many electrochemical cells, e.g. in the case of lithium batteries in the form of round cells, the battery films required, i.e. cathode films, anode films and separator films, are combined using a winding apparatus to give a battery winding. In conventional lithium-ion batteries, the cathode films and anode films are bonded to collector electrodes in the form of, for example, an aluminum foil or a copper foil. Metal foils of this type ensure adequate mechanical stability.

In contrast, the separator film must resist mechanical stresses in its own right, and this poses no problems for conventional separator films based, for example, on polyolefins, at the thickness in which they are used.

Presently, these polyolefin separators are produced by wet processes or a dry process as disclosed in e.g. JP 05-21050 and JP 06/181058, respectively. During the wet process the extruded film which contains a paraffin is extracted by a solvent and extended in order to give micropores. Within the dry process, the extruded film must be kept for a considerable time for sufficient spherulite growths and a slow drawing is necessary in order to give an appropriate porosity due to cracks in the separator film.

These micropores enable Li ion transfer through polyolefin separator films. The number of the micropores is measured by the Gurley method (ISO 5635/5: 1996 paper and board determination of air permeance (medium range)-part 5: Gurley Method). This elaborate procedure which yields micropores renders these separators relatively expensive, although the starting material is cheap. Polyolefin separators have current shutdown characteristics within a temperature range of from 130 to 170° C. as the micropores close in this temperature range. But these separators do not show any electric insulation above their melting point, as they melt in a temperature range of about 140 to 170° C. and therefore there remains a relatively high risk of severe damages when the battery exceeds this temperature range. In batteries, which have larger surfaces the chance for short circuit also rises above temperatures of about 60° C., since at this temperature the polyolefin already starts to shrink.

In order to avoid heat shrinkage of polyolefin separators, it is desirable to hot-laminate these separators on electrodes. However, this method is difficult to be adapted since some of the micro pores in the separators may be already closed at the lamination temperature.

Furthermore, separators on the basis of a co-polymer made of vinylidenedifluoride and hexafluoropropylene has been proposed in U.S. Pat. No. 5,540,741 and U.S. Pat. No. 5,478,668. However, from these separators, the plastisizer has to be extracted which renders the preparation process thereof difficult and expensive. Furthermore, these copolymer films usually melt around 130 to 160° C. and the copolymer on the basis on vinylidenedifluoride and hexafluoropropylene is to be regarded as a relative expensive polymer.

Also proposed as separators have been gel polymer electrolytes on the basis of polyacrylonitrile or UV hardenable macromers in e.g. U.S. Pat. No. 5,609,974 and U.S. Pat. No. 5,603,982, respectively. However, gel electrolytes have difficulties with respect to their performance at high current discharges of equal or above 2.5 $mA/cm^2$, since the Li ions only move slowly in the gel electrolytes. Moreover, these gel polymer electrolytes are not suitable for mass production, since both the swelling and the cross-liking step are complicated and time consuming.

A separator on the basis of a mixture comprising a composition including a solid and a polymeric mass, usually comprising a condensation product of a polyhydric alcohol whose main chain contains carbon and oxygen atoms and a compound capable of reacting with such a polyhydric alcohol is disclosed e.g. in DE-A 196 12 769.

A method for producing a molded article, preferably a sheet-type molded article comprising compounding and melt extruding a blend, which contains a pigment, which could also be an electrochemical inert solid and at least polymeric binder, which could also be a polyurethane and optionally a plasticizer is disclosed in DE-A 197 13 072.0.

We have found out that membranes which consist of specified polyurethane elastomers and a solid as being produced by e.g. a casting process give satisfactory Li ion transfer speed in battery applications at high current charge and discharge of equal or above 2.5 $mA/cm^2$ even though these membranes show very high Gurley values, i.e. very high air pass resistance, which means that the membranes of the invention have very few continuous micropores compared to current polyolefin separators. Membranes of this kind do neither shrink nor melt down even at temperatures above 200° C. This prevents short circuits within a temperature range of 170 to 200° C. due to shrinkage which might well be the case when using polyolefin separators. Thus, these membranes may be used for bigger surface batteries. Other advantages of said membranes are their suitability for being laminated on electrodes by heat and their good contact with the electrode surface when manufactured into round cells and prismatic cells by using a respective winding device.

These and other objects are achieved by means of the novel membrane according to the invention.

Thus, the present invention relates to a membrane comprising a composition including
(a) 1 to 99 wt-% of at least one polyurethane elastomer comprising at least one hard segment and at least one soft segment, and
(b) 99 to 1 wt-% of a solid, wherein said solid is incorporated in said at least one thermoplastic polyurethane elastomer.

The components present in the film of the invention are now described in greater detail below.

The solids used in this film are mainly inorganic solids, preferably inorganic basic solids selected from the class consisting of oxides, compound oxides, silicates, sulfates, carbonates, phosphates, nitrides, amides, imides and carbides of the elements of the 1st, 2nd, 3rd or 4th main group or the 4th subgroup of the periodic table; a polymer selected from the class consisting of polyethylene, polypropylene, polystyrene, polytetrafluoroethylene, polyvinylidene fluoride, polyamides and polyimides; a solid dispersion comprising a polymer of this type; or a mixture of two or more of these.

Particular examples are: oxides, such as calcium oxide, silica, alumina, magnesium oxide and titanium dioxide, mixed oxides, for example of the elements silicon, calcium, aluminum, magnesium and titanium; silicates, such as ladder-type, ino-, phyllo- and tectosilicates, preferably wollastonite, in particular hydrophobicized wollastonite, sulfates, such as those of alkali metals and alkaline-earth metals; carbonates, for example those of alkali metals and alkaline-earth metals, for example calcium, magnesium, barium, lithium, potassium and sodium carbonate; phosphates, such as apatites; nitrides; amides; imides; carbides; polymers, such as polyethylene, polypropylene, polystyrene, polytetrafluoroethylene and polyvinylidene fluoride; polyamides; polyimides; and other thermoplastics, thermosets and microgels, solid dispersions, in particular those which comprise the polymers mentioned above, and also mixtures of two or more of the above entioned solids.

Particularly to be mentioned are: Wollastonit ($CaSiO_3$), $CaCO_3$, mixed oxides or carbonates of Mg and Ca, such as dolomite, in the grounded and precipitated form, respectively, silicates ($SiO_2$), talc ($SiO_2*MgO$), $Al_2O_3$, caolin ($Al_2O_3*SiO_2$), and synthesized ceramics, polymer powders which do not solve into electrolyte solvents, preferably those as specifically mentioned above, and surface-treated fillers, which have been treated with e.g. silane cuppling agents which are electrochemically stable.

According to the invention, the solids used may also be inorganic Li-ion-conducting solids, preferably an inorganic basic Li-ion-conducting solid.

Examples of these are: lithium borates, such as $Li_4B_6O_{11}*xH_2O$, $Li_3(BO_2)_3$, $Li_2B_4O_7*xH_2O$, $LiBO_2$, where x can be a number from 0 to 20; lithium aluminates, such as $Li_2O*Al_2O_3*H_2O$, $Li_2Al_2O_4$, $LiAlO_2$; lithium aluminosilicates, such as lithium-containing zeolites, feldspars, feldspathoids, phyllo- and inosilicates, and in particular $LiAlSi_2O_6$ (spodumene), $LiAlSiO_{10}$ (petullite), $LiAlSiO_4$ (eucryptite), micas, such as $K[Li,Al]_3[AlSi]_4O_{10}(F-OH)_2/K[Li,Al,Fe]_3[AlSi]_4O_{10}(F-OH)_2$; lithium zeolites, in particular those whose form is fiber-like, sheet-like or cube-like, in particular those of the formula $Li_{2/z}O*Al_2O_3*xSiO_2*yH_2O$ where z corresponds to the valence, x is from 1.8 to about 12 and y is from 0 to about 8; lithium carbides, such as $Li_2C_2$, $Li_4C$; $Li_3N$; lithium oxides and lithium mixed oxides, such as $LiAlO_2$, $Li_2MnO_3$, $Li_2O$, $Li_2O_2$, $Li_2MnO_4$, $Li_2TiO_3$; $Li_2NH$; $LiNH_2$; lithium phosphates, such as $Li_3PO_4$, $LiPO_3$, $LiAlFPO_4$, $LiAl(OH)PO_4$, $LiFePO_4$, $LiMnPO_4$; $Li_2CO_3$; lithium silicates in the form of ladder-type, ino-, phyllo- and tectosilicates, such as $Li_2SiO_3$, $Li_2SiO_4$, $Li_2S-SiS_2$, and mechanically milled products from $Li_2S$, $SiS_2$ and $Li_4SiO_2$, wherein the most preferably product constituted by these three compounds has the following composition: 95 wt-% (0,6 $Li_2S$ 0,4$SiS_2$) 5 wt-% $Li_4SiO_4$, and $Li_6Si_2$; lithium sulfates, such as $Li_2SO_4$, $LiHSO_4$, $LiKSO_4$; the Li compounds mentioned during the discussion of the cathode layer, the presence of conductive carbon black being excluded when these are used as solid III; and also mixtures of two or more of the Li-ion-conducting solids mentioned above.

Basic solids are particularly suitable here. For the purposes of the invention, basic solids are those whose mixture with a liquid water-containing diluent, which itself has a pH of not more than 7, has a higher pH than this diluent.

The solids should advantageously be substantially insoluble in the liquid used as electrolyte, and also be electrochemically inert in the battery medium.

Particularly suitable solids are those which have a primary particle size of from 5 nm to 30 microns, preferably from 0.01 to 30 microns and in particular from 0.01 to 10 microns, and more particular 0.1 to 6 microns, the particle sizes given being determined by electron microscopy. The melting point of the solids is preferably above the usual operating temperature of the electrochemical cell, and melting points of above 120° C., in particular above 150° C., have proven particularly advantageous.

The solids here may be symmetrical in their external shape, i.e. have a dimensional ratio of height:width:length (aspect ratio) of about 1 and be shaped as spheres or pellets, be approximately round in shape, or else be in the shape of any desired polyhedron, such as a cuboid, tetrahedron, hexahedron, octahedron or bipyramid, or may be distorted or asymmetric, i.e. have a dimensional ratio height:width:length (aspect ratio) which is not equal to 1 and be, for example, in the form of needles, asymmetrical tetrahedra, asymmetrical bipyramids, asymmetrical hexa- or octahedra, lamellae or plates, or have fiber-like shape. If the solids are asymmetric particles, the upper limit given above for the primary particle size refers to the smallest axis in each case.

The content of said solid within the film usually ranges from 1 to 99 wt-%, preferably 5 to 97 wt-% and more preferably 10 wt-% to 90 wt-%.

Furthermore, the membrane according to the invention contains as the matrix at least one thermoplastic polyurethane elastomer comprising at least one hard segment and at least one soft segment. The amount of said thermoplastic polyurethane elastomer present ranges generally from 1 to 99 wt-%, preferably 3 to 95 wt-% and more preferably 10 wt-% to 90 wt-%.

The hard and soft segments used may be of the same or different type, the number thereof being one or more, respectively.

In principle, it is possible within the present invention to use all polyurethane elastomers comprising at least one hard segment and at least one soft segment. A general outline regarding the polymers of said kind may be deduced from an article by D. Dieterich, taken from Kunststoff Handbuch "Polyurethane", Carl Hanser Verlag, 3. Auflage, München 1993, S. 11–56, particularly p. 40–47, which particularly refers to segmented polyurethanes.

Preferably, as polyurethane elastomer those are used which contain at least two thermoplastic, nonelastic polymer blocks having a melting temperature above 100° C. and an average molecular weight of 240 to 10.000 (hard segment) and between said thermoplastic, nonelastomeric polymer blocks an elastomeric block having a glass transition temperature below 10° C., preferably below −10° C. and an average molecular weight of about 240 to 100.000, preferably 1000 to 10.000.

Preferably a polyurethane elastomer is used, wherein the melting point of the hard segment, which contains chain extenders and a corresponding amount of diisocyante, is more than 140° C., preferably more than 160° C. and wherein the soft segment, which contains polymeric polyols, comprises ether-linkages, ester-linkages or carbonate-linkages or a combination of two or more thereof.

For preparing the polyurethane elastomer as used within the membrane according to the invention organic diisocyanates, polymeric polyols and short chain extenders are reacted with each other in a manner known in the art.

As the polyurethane elastomers, the following are to be particularly mentioned:

Polyurethanes, obtainable for example by reacting the following components (a) to (c) in a manner known in the art.

(a) organic diisocyanates having from 6 to 30 carbon atoms, preferably aliphatic diisocyanates, such as e.g. 1,6-hexamethylene diisocyanate, 2-methyl-1,5-pentamethylene diisocyanate, 2-ethyl-1,4-butylene diisocyanate or mixtures of at least two of the mentioned $C_6$-alkylene diisocyanates, 1,5-pentamethylene diisocyanate and 1,4-butylene diisocyanate; cycloaliphatic diisocyanate, such as e.g. 1-isocyanato-3,3,5-trimethyl-5-isocyanatomethyl-cyclohexane (isophorone diisocyanate) 1,4- and/or 1,3-bis(isocyanatomethyl) cyclohexane (HXDI), 1,4-cyclohexane diisocyanate, 1-methyl-2,4- and -2,6-cyclohexane diisocyanate as well as the corresponding mixtures of isomers, 4,4'-2,4'-and 2,2'-dicyclohexylmethane diisocyanate as well as the corresponding mixtures of isomers; and preferably aromatic diisocyanates, such as e.g. 2,4-toluylene diisocyanate, mixtures of 2,4- and 2,6-toluylene diisocyanate, 3,3'-dimethyl-4,4'-biphenyl diisocyanate (TODI), p-phenylene diisocyanate (PDI), m-, p-xylylene diisocyanate (XDI), 4,4'-, 2,4'- and 2,2'-diphenylmethane diisocyanate (MDI), mixtures of 2,4'- and 4,4'-diphenylmethane diisocyanate, urethane modified liquid 4,4'-and/or 2,4-diphenylmethane diisocyanate, 4,4'-diisocyanato 1,2-diphenylethane (EDI) and 1,5-naphthylen diisocyanate, m-tetramethylxylene diisocyanate, p-tetramethylxylene diisocyanate and 1,5-tetrahydronaphthylene diisocyanate, and mixtures of two or more of such compounds, the 1,5-naphthylene diisocyanate, 4,4'-bicyclohexylmethane diisocyanate, 1,6-hexamethylene diisocyanate, mixtures of isomers of diphenylmethane diisocyanate having a 4,4'-diphenylmethane diisocyanate content of higher than 96 wt-% being preferably used, the 4,4'-diphenylmethane diisocyanate and 1,6-hexamethylene diisocyanate being particularly preferred.

(b) polymeric polyols, such as polyesterols, polyetherols, preferably having an equivalent molecular weight of 120 to 8000, more preferably 200 to 3000 and most preferably 500 to 2000 and hydroxyl groups containing polymers, such as e.g. polyacetales, such as polyoxymethylene and particularly water-insoluble formals, e.g. polybutanediol formal and polyhexanediol formal and aliphatic polycarbonates, particularly those which are made from diphenylcarbonate and 1,6-hexanediol, being prepared by transesterification, said polymers having the above mentioned molecular weights. The said polyhydroxyl compounds may be applied as single components or in the form of mixtures.

It is expedient if the polyesterols are predominantly linear polymers having terminal OH groups, preferably those having two or three, in particular two terminal OH groups. The acid number of the polyesterols is smaller than 10 and preferably smaller than 3. The polyesterols may be prepared in a simple manner by esterifying aliphatic dicarboxylic acids having from 4 to 15 carbon atoms, preferably from 4 to 6 carbon atoms, with glycols, preferably glycols having from 2 to 25 carbon atoms, preferably 2 to 9 carbon atoms or by polymerizing lactones having from 3 to 20, preferably 3 to 9 carbon atoms. Examples of dicarboxylic acids which may be used are fumaric acid, glutaric acid, pimelic acid, suberic acid, sebacic acid, dodecanoic acid, and preferably adipic acid and succinic acid. The dicarboxylic acids may be used individually or mixed. To prepare the polyesterols it may be advantageous where appropriate to use the corresponding acid derivatives, such as carboxylic anhydrides or carboxylic acid chlorides, instead of the dicarboxylic acids. Examples of lactones suitable for preparing the polyesterols are α,α-dimethyl-β-propiolactone, γ-butyrolactone and preferably ϵ-caprolactone.

The polyetherols are essentially linear compounds having terminal hydroxyl groups and containing ethereal bonds. Suitable polyetherols may readily be prepared by polymerizing cyclic ethers, such as tetrahydrofuran, or by reacting one or more alkylene oxides having from 2 to 4 carbon atoms in the alkylene radical with a starter molecule which contains two bonded active hydrogen atoms. Examples of alkylene oxides are ethylene oxide, 1,2-propylene oxide, epichlorohydrin, 1,2-butylene oxide and 2,3-butylene oxide. The alkylene oxides may be used individually, alternately one after the other, or as a mixture. Examples of starter molecules are water, glycols, such as ethylene glycol, propylene glycol, 1,4-butanediol and 1,6-hexanediol, amines, such as ethylenediamine, hexamethylenediamine and 4,4'-diaminodiphenylmethane, and aminoalcohols, such as ethanolamine. Suitable polyesterols and polyetherols and also the preparation of these, are described, for example, in EP-B 416 386, and suitable polycarbonatediols, preferably those based on 1,6-hexanediol, and also the preparation of these, are described, for example, in U.S. Pat. No. 4,131,731.

The polymeric polyols may carry functional groups, for example neutral groups, such as siloxane groups, basic groups, such as in particular tertiary amino groups, or acid groups or salts of these, or groups which are easily converted into acid groups, introduced via a polyhydric alcohol. Use may preferably be made of diol components which carry groups of this type, for example N-methyldiethanolamine, diethyl N,N-bis(hydroxyethyl)aminomethylphosphonate or 3-sulfopropyl N,N-bis(hydroxyethyl)-2-aminoacetate or of dicarboxylic acids which carry groups of this type and can be used for preparing polyesterols, for example 5-sulfoisophthalic acid.

Acid groups are in particular the phosphoric acid, phosphonic acid, sulfuric acid, sulfonic acid, carboxyl or ammonium group.

Examples of groups which are readily converted into acid groups are the ester group and salts, preferably those of the alkali metals, for example lithium, sodium or potassium.

Preferably used as polymeric polyols of the polyester-type are polyethylene adipate, polyethylenebutylene adipate, polybutylene adipate, polybutylenehexane adipate, polyhexane adipate, diols of the polyether-type, such as e.g. polyethylene glycol, polypropylene glycol, polyethylenepropylene glycol, polytetramethylene glycol, as well as those of polycarbonate-type, such as e.g. polyhexancarbonate diol.

(c) Chain extenders

Use is advantageously made of amounts of up to 40% by weight, based on the total weight of the alcohols, of aliphatic diols having from 2 to 20 carbon atoms, preferably from 2 to 10 carbon atoms, for example 1,2-ethanediol, 1,3-propanediol, 1,4-butanediol, 1,6-hexanediol, 1,5-pentanediol, nonanediol, 1,2-propanediol, 1,10-decanediol, 2-methyl-1,3-propanediol, 2,2-dimethyl-1,3-propanediol, 2-methyl-2-butyl-1,3-propanediol, 2,2-dimethyl-1,4-butanediol, 1,4-dimethylolcyclohexane, the neopentyl glycol ester of hydroxypivalic acid, diethylene glycol, triethylene glycol and methyldiethanolamine, or of aromatic-aliphatic or aromatic-cycloaliphatic diols having from 8 to 30 carbon atoms, where as aromatic structures heterocyclic ring systems or preferably isocyclic ring systems, such as naphthalene derivatives or in particular benzene derivatives, such as bisphenol A, doubly symmetrically ethoxylated bisphenol A, hydroquinone, doubly symmetrically propoxylated bisphenol A or higher ethoxylated or propoxylated bisphenol A derivatives, or bisphenol F derivatives, or also mixtures of compounds of this type, are possible; mixtures of compounds of this type may also be used.

Suitably used may be also the esters of terephthalic acid and alkanediols having 2 to 4 carbon atoms, such as terephthalic acid-(bis-)ethanediol or -1,4-butanediol, hydroxy alkylen ethers of hydroquinone, such as 1,4-di-(β-hydroxyethyl)-hydroquinone, (cyclo) aliphatic diamines, such as 4,4'-diaminodicyclohexylmethane, 3,3'-dimethyl-4,4'-diaminodicyclohexylmethane, 1-amino-3,3,5-trimethyl-5-aminomethyl-cyclohexane, ethylene diamine, 1,2-, 1,3-propylene diamine, N-methyl-1,3-propylene diamine, N,N'-dimethylethylene diamine and aromatic diamines, such as e.g. 2,4- and 2,6-toluylene diamine, 3,5-diethyl-2,4- and -2,6-toluylene diamine and primary ortho-di, -tri- and/or -tetraalkyl substituted 4,4'-diamino diphenylmethane.

As may be come apparent already from the above definition, the chain extenders (c) usually have molecular weights in the range of 60 to 499, preferably 60 to 300.

Use may advantageously be made of amounts of up to 5% by weight, based on the total weight of the alcohols, of aliphatic triols having from 3 to 15 carbon atoms, preferably from 3 to 10 carbon atoms, such as trimethylolpropane or glycerol, the reaction product of compounds of this type with ethylene oxide and/or propylene oxide, or also mixtures of compounds of this type.

Preferably used as chain extenders are ethylene glycol, 1,4-butanediol, hexanediol and ethylene diamine.

(d) Suitable catalysts, which particularly accelerate the reaction between the NCO groups of the diisocyanates (a) and the hydroxyl groups of the components (b) and (c) are those known from the prior art and commonly used and include tertiary amines, such as triethylamine, dimethylcyclohexylamine, N-methylmorpholine, N,N'-dimethylpiperazine, 2-(dimethylaminoethoxy)ethanol diazabicyclo-(2,2,2)-octane and similar compounds, such as particularly organic metal compounds, such as titanic acid esters, iron compounds, such as iron (III) acetylacetonate, tin compounds, such as tin diacetate, tin dioctoate, tin dilaurate or tin dialkyl salts of aliphatic carboxylic acids, such as dibutyl tindiacetate, dibutyltindilaurate and similar compounds. The catalysts are commonly used in amounts of 0.002 to 0.1 parts per 100 parts polyol (b).

(e) Besides the catalysts, also commonly used adjuvants and/or additives (e) may be added to the components (a) to (c). To be mentioned are e.g. surfactants, flame inhibitors, nucleating agents, oxidation retarders, stabilizers, inhibitors, stabilizers against hydrolysis, light, heat and decoloration as well as plasticizers.

The preparation of polyurethane elastomers starting from e.g. the described starting components is generally known in the art. It is for example possible to react the reaction mixture comprising (a), (b), (c) and optionally (d) and/or (e) according to the well-known one-shot or according to the prepolymerization process, e.g. in a reaction extruder and/or by using a commonly band apparatus.

Within the present invention, it is also possible to crosslink the above-defined polyurethane elastomer, optionally together with the other constituents of the membrane according to the invention. In order to do so, generally polyfunctional momomers and/or oligomers can be added in an amount of up to 50 wt.-%, preferably 0.5 to 30 wt.-% and more preferably in an amount of 1 to 20 wt.-%, relative to the thermoplastic polyurethane elastomer, respectively. As the polyfunctional monomers and oligomers those typically used for crosslinking in polymer chemistry may be suitably used, including those mentioned as polyols herein before.

Individual preferred crosslinking compounds which may be mentioned are: acrylates and methacrylates of ethylene glycol, diethylene glycol, triethylene glycol, tetraethylene glycol and mixtures thereof; acrylates and methacrylates of propylene glycol, dipropylene glycol, tripropylene glycol, tetrapropylene glycol and mixtures thereof; acrylates and methacrylates of glycerine, diglycerine, trimethylolpropane, pentaerithritol, sucrose, sorbitol, butanediol, pentanediol, hexanediol, heptanediol, octanediol, nonanediol; cyclopentadiendiol, cyclooctadiendiol and ethylene oxide or propylene oxide adducts with the polyols; ethylene oxide and propylene oxide adducts of bisphenole A, bisphenole F; and hydroquinones.

Furthermore, crosslinking via epoxide-group containing monomers, oligomers and polymers is possible in a manner known per se.

If it is desired to crosslink the membrane layers, this may be done in a manner known per se, for example by irradiating with ionic or ionizing radiation, or an electron beam, preferably with an acceleration voltage of from 20 to 2000 kV and a radiation dose of from 5 to 50 Mrad, or UV or visible light, and it is advantageous here to add an initiator, such as benzil dimethyl ketal or 1,3,5-trimethylbenzoyltriphenylphosphine oxide, in amounts of in particular at most 1% by weight, based on the constituents to be crosslinked in the starting materials, and the crosslinking may generally be carried out within from 0.5 to 15 minutes, advantageously under an inert gas, such as nitrogen or argon; by dthermal free-radical polymerization, preferably at temperatures above 60° C., it being possible and advantageous to add an initiator, such as azobisisobutyronitrile, generally in amounts of at most 5% by weight, preferably from 0.05 to 1% by weight, based on the constituents to be crosslinked in the starting materials; by electrochemically induced polymerization; or by ionic polymerization, for example by acid-catalyzed cationic polymerization, possible catalysts being primarily acids, preferably Lewis acids, such as $BF_3$ or in particular $LiBF_4$ or $LiPF_6$. Lithium-ion-containing catalysts, for example $LiBF_4$ or $LiPF_6$, here may advantageously remain as conducting salt in the separator.

Preferred polyurethane elastomers to be used within the present invention are those consisting of polymeric glycols, short chain extenders and diisocyanates, the among those particularly preferred polyurethane elastomers having the following composition:

polymeric glycol content: 97 to 30 wt.-%, preferably 95 to 40 wt.-%, more preferably 90 to 45 wt.-%, based on the polyurethane;

Equivalent molecular weight of the polymeric glycols being in the range of 120 to 6000, preferably 200 to 3000 and more preferably 500 to 2000;

the NCO/OH ratio during the polyurethane synthesis being in the range of 0.95 to 1.05, preferably 0.97 to 1.02 and more preferably 0.99 to 1.01.

Also preferred are those consisting of polymeric polyols, short chain extenders, cross-linking agents and diisocyonates having the following composition:

polymeric polyol content: 97 to 30 wt.-%, preferably 95 to 40 wt.-%, more preferably 90 to 45 wt.-%, based on the polyurethane;

Equivalent molecular weight of the polymeric polyols being in the range of 120 to 6000, preferably 200 to 3000 and more preferably 500 to 2000;

the NCO/OH ratio during the polyurethane synthesis being in the range of 0.95 to 1.05, preferably 0.97 to 1.02 and more preferably 0.99 to 1.01.

Within the present invention, preferably used are thermoplastic polyurethane elastomers (TPU) wherein basically the same components (a) and (c) to (e) may be used. However, in order to obtain a polyurethane elastomer having also the characteristic of thermoplasticity it is necessary to use predominantly difunctional polymeric polyols, i.e. the average functionality of component (b) lies preferably in the range of 1.8 to 2.6, particularly preferably in the range of 1.9 to 2.2. These TPU's are thus predominantly linear, i.e. predominantly non-cross-linked, while, as outlined above with respect to the polyurethane elastomers, this is not ruled out within the broader aspect of the invention.

With respect to the polymeric polyols (b) also for the preparation of the TPU's generally the same polymeric polyols and hydroxyl group containing polymers as mentioned above with respect to the polymeric polyols (b) may be used.

Preferably used are polyetherols on the basis of 1,2-propylene oxide and ethylene oxide, wherein more than 50%, preferably 60 to 100% of the OH-groups are primary hydroxyl groups and wherein at least a part of the ethylene oxide represents the terminal block, and particularly polyoxytetramethylene glycols (polytetrahydrofurane). The essentially linear polyetherals as used for the TPU's exhibit generally molecular weights of from 120 to 8000, preferably 500 to 8000, more preferably 500 to 6000, particularly 500 to 3500 and most preferably 500 to 2000. They may be used individually or in the form of mixtures of 2 or more thereof.

Suitable polyesterols may be prepared from e.g. commonly used dicarboxylic acid having 2 to 12 carbon atoms, preferably 4 to 8 carbons atoms, such as succinic acid, glutaric acid, suberic acid, azelaic acid, sebacic acid, adipic acid, phthalic acid, isophthalic acid and/or terephthalic acid and known polyfunctional alcohols, such as ethane diol, 1,3-propane diol, 1,4-butane diol, 1,5-pentane diol, 1,6-hexane diol, 1,10-decane diol, 2,2-dimethyl-1,3-propane diol, 1,2-propane diol, diethylene glycol and/or dipropylene glycol.

Furthermore, esters of carbonic acid with suitable diols, particularly those having 4 to 6 carbon atoms, such as 1,4-butane diol and/or 1,6-hexane diol, condensation products of omega-hydroxycarboxylic acids, such as omega-hydroxycapronic acid and preferably polymerization products of lactones, e.g. optionally substituted omega-caprolactones may be suitably used.

As the polyesterols suitably used may be alkane diol-polyadipates having 2 to 6 carbon atoms in the alkylene group, such as ethane diol-polyadipate, 1,4-butane diol-polyadipate, ethane diol-1,4-butane diol-polyadipate, 1,6-hexane diol-neopentyl glycol-polyadipate, polycaprolactone and particularly 1,6-hexane diol, 1,4-butane diol-polyadipate.

The polyesterols exhibit preferably molecular weights (weight average molecular weight) of from 500 to 6000, particularly preferably of from 500 to 3500 and even more preferably from 500 to 2000.

For achieving the commonly desired hardness of the TPU's and of their melting points, the components (b) and (c) are usually varied in a molar ratio (b):(c) of 1:0,8 to 1:10, preferably 1:1 to 1:6,4, wherein the hardness and the melting point of the TPU increases with a higher amount of diols.

Preferably are used TPUs on the basis of:
(a) 4,4'-diphenylmethane diisocyanate (MDI) and/or hexamethylene diisocyanate,
(b) polyoxytetramethylene glycol, polyetherols on the basis of 1,2-propylene oxide and ethylene oxide and/or polyesterols on the basis of alkanediol polyadipates having 2 to 6 carbon atoms in the alkylene group, and
(c) 1,2-ethane diol, 1,4-butane diol, ethane diol and/or 1,6-hexane diol, wherein the ratio of the isocyanate groups of component (a) to the sum of the components (b) and (c) preferably lies in the range of 1:0,9 to 1:1,1 and (b) and (c) are particularly preferably used in a molar ratio of (b):(c) of 1:1 to 1:6,4.

Furthermore, the membrane according to the invention may also comprise other thermoplastic polymers, such as polyethylene oxide, copolymers on the basis of polyvinylidenedifluoride, polyacrylonitrile and poly(meth)acrylates, such as polymethyl methacrylate. When using these other polymers, the ratio thereof will be within the range of 5 to 400 parts by weight based on 100 parts by weight of the thermoplastic polyurethane elastomer.

The above defined thermoplastic polyurethane elastomers may be produced according to commonly known processes.

The film according to the invention may also contain a plasticizer.

The plasticizers used may be aprotic solvents, preferably those which solvate Li ions, for example dimethyl carbonate, diethyl carbonate, dipropyl carbonate, diisopropyl carbonate, dibutyl carbonate, ethylene carbonate and propylene carbonate; oligoalkylene oxides, such as dibutyl ether, di-tert-butyl ether, dipentyl ether, dihexyl ether, diheptyl ether, dioctyl ether, dinonyl ether, didecyl ether, didodecyl ether, ethylene glycol dimethyl ether, ethylene glycol diethyl ether, 1-tert-butoxy-2-methoxyethane, 1-tert-butoxy-2-ethoxyethane, 1,2-dimethoxypropane, 2-methoxyethyl ether, 2-ethoxyethyl ether, diethylene glycol dibutyl ether, dimethylene glycol tert-butyl methyl ether, triethylene glycol dimethyl ether, tetraethylene glycol dimethyl ether, γ-butyrolactone and dimethylformamide; hydrocarbons of the formula $C_nH_{2n+2}$ where $7<n<50$; organic phosphorus compounds, in particular phosphates and phosphonates, such as trimethyl phosphate, triethyl phosphate, tripropyl phosphate, tributyl phosphate, triisobutyl phosphate, tripentyl phosphate, trihexyl phosphate, trioctyl phosphate, tris(2-ethylhexyl)phosphate, tridecyl phosphate, diethyl n-butyl phosphate, tris(butoxyethyl)phosphate, tris(2-methoxyethyl) phosphate, tris(tetrahydroftryl)phosphate, tris(1H,1H,5H-octafluoropentyl) phosphate, tris(1H, 1H-trifluoroethyl)phosphate, tris (2-(diethylamino)ethyl) phosphate, diethyl ethylphosphonate, dipropyl propylphosphonate, dibutyl butylphosphonate, dihexyl hexylphosphonate, dioctyl octylphosphonate, ethyl dimethylphosphonoacetate, methyl diethylphosphonoacetate, triethyl phosphonoacetate, dimethyl 2-oxopropylphosphonate, diethyl 2-oxopropylphosphonate, dipropyl 2-oxopropylphosphonate, ethyl diethoxyphosphinylformate, trimethyl phosphonoacetate, triethyl phosphonoacetate, tripropyl phosphonoacetate and tributyl phosphonoacetate; organic sulfur compounds, such as sulfates, sulfonates, sulfoxides, sulfones and sulfites, for example dimethyl sulfite, diethyl sulfite, glycol sulfite, dimethyl sulfone, diethyl sulfone, diethylpropyl sulfone, dibutyl sulfone, tetramethylene sulfone, methylsulfolane, dimethyl sulfoxide, diethyl sulfoxide, dipropyl sulfoxide, dibutyl sulfoxide, tetramethylene sulfoxide, ethyl methanesulfonate, 1,4-butanediol bis(methanesulfonate), diethyl sulfate, dipropyl sulfate, dibutyl sulfate, dihexyl sulfate, dioctyl sulfate and $SO_2ClF$; and nitriles, such as acrylonitrile; dispersants, in particular those with surfactant structure; and mixtures of these.

The content of plasticizers in the film, based on the composition present therein (i.e. the sum of the thermoplastic polyurethane elastomer plus solid) is from 0 to 200% by weight, preferably from 0 to 100% by weight and more preferably from 0 to 70% by weight.

The composition according to the invention may be dissolved and dispersed in an inorganic, but preferably organic liquid diluent, the resulting mixture being intended to have a viscosity of preferably 100 to 50.000 mPas, and then applying this solution or dispersion in a manner known per se, such as by casting, spraying, pouring, dipping, spin coating, roller coating or printing—by relief, intaglio, planographic or screen printing—to a carrier material. Subsequent processing can be done by customary methods, for example by removing the diluent and curing the binder.

Suitable organic diluents are aliphatic ethers, especially tetrahydrofuran and dioxane, hydrocarbons, especially hydrocarbon mixtures such as petroleum spirit, toluene and xylene, aliphatic esters, especially ethyl acetate and butyl acetate, and ketones, especially acetone, ethyl methyl ketone, cyclohexanone, diethylformamide, chloroform, 1,1,2,2 tetrachloroethane and diethylacetamide. Mixtures of such diluents can also be employed.

Suitable carrier materials are those materials customarily used for electrodes, preferably metals such as aluminum and copper. It is also possible to use temporary supports, such as films, especially polyester films such as polyethylene terephthalate films. Such films may advantageously be provided with a release layer, preferably comprising polysiloxanes.

The preparation of the solid electrolytes and separators starting from the composition can also be carried out by thermoplastic methods, for example by injection molding, casting, compression molding, kneading or extrusion, with or without a subsequent calendering step of the described mixture according to the invention.

After forming a film of the mixture, volatile components such as solvent or plasticizer can be removed.

In case the film according to the invention should be used as a solid electrolyte or a cathode in an electrochemical cell, a dissociable, lithium cations containing compound, a so-called conducting salt, and optionally further additives, such as especially organic solvents, a so-called electrolyte, which may preferably be selected among the above-mentioned plasticizers, should be incorporated.

These compounds may be admixed partly or completely during the preparation of the film from the composition, or may be incorporated into the layer after the preparation thereof.

The conducting salts which can be used are those generally known and described, for example, in EP-A 0 096 629.

Conducting salts preferably used according to the invention are $LiPF_6$, $LiBF_4$, $LiClO_4$, $LiAsF_6$, $LiCF_3SO_3$, $LiC(CF_3SO_2)_3$, $LiN(CF_3SO_2)_2$, $LiN(SO_2C_nF_{2n+1})_2$, $LiC[(C_nF_{2n+1})SO_2]_3$, $Li(C_nF_{2n+1})SO_3$, where n in each case is from 2 to 20, $LiN(SO_2F)_2$, $LiAlC_4$, $LiSiF_6$, $LiSbF_6$ or a mixture of two or more of these, the use of $LiBF_4$ or $LiPF_6$ being preferred.

These conducting salts are used in amounts of from 0.1 to 50% by weight, preferably 0.1 to 20% by weight, in particular from 1 to 10% by weight, based in each case on the material forming the respective layer.

The film according to the invention generally has a thickness of from 3 to 500 microns, preferably from 5 to 500 microns, more preferably from 10 to 200 microns.

Furthermore, the present invention relates to a composite comprising at least one first layer comprising an electron-conducting electrochemically active compound, and at least one second layer comprising the membrane according to the invention, said membrane being free of an electron-conducting electrochemically active compound.

The composite, also preferably in the form of a film, generally has a total thickness of from 15 to 1500 microns, in particular from 50 to 500 microns.

Said first layer is preferably a conventional cathode in film form and may thus comprise an electron-conducting electrochemically active compound being generally used for cathodes, preferably a lithium compound. To be mentioned are in particular:
$LiCoO_2$, $LiNiO_2$, $Li_xMnO_2$ ($0<x\leq1$), $Li_xMn_2O_4$ ($0<x\leq2$), $Li_xMoO_2$ ($0<x\leq2$), $Li_xMnO_3$ ($0<x\leq1$), $Li_xMnO_2$ ($0<x\leq2$), $Li_xMn_2O_4$ ($0<x\leq2$), $Li_xV_2O_4$ ($0<x\leq2.5$), $Li_xV_2O_3$ ($0<x\leq3.5$), $Li_xVO_2$ ($0<x\leq1$), $Li_xWO_2$ ($0<x\leq1$), $Li_xWO_3$ ($0<x\leq1$), $Li_xTiO_2$ ($0<x\leq1$), $Li_xTi_2O_4$ ($0<x\leq2$), $Li_xRuO_2$ ($0<x\leq1$), $Li_xFe_2O_3$ ($0<x\leq2$), $Li_xFe_3O_4$ ($0<x\leq2$), $Li_xCr_2O_3$ ($0<x\leq3$), $Li_xCr_3O_4$ ($0<x\leq3.8$), $LiV_3S_5$ ($0<x\leq1.8$), $Li_xTa_2S_2$ ($0<x\leq1$), $Li_xFeS$ ($0<x\leq1$), $Li_xFeS_2$ ($0<x\leq1$), $Li_xNbS_2$ ($0<x\leq2.4$), $Li_xMoS_2$ ($0<x\leq3$), $Li_xTiS_2$ ($0<x\leq2$), $Li_xZrS_2$ ($0<x\leq2$), $Li_xNbSe_2$ ($0<x\leq3$), $Li_xVSe_2$ ($0<x\leq1$), $Li_xNiPS_2$ ($0<x\leq5$), $Li_xFePS_2$ ($0<x\leq1.5$).

In another embodiment of the present invention, the film according to the invention functions as a second layer within a composite comprising as at least one first layer being preferably a conventional anode in film form and thus includes an electron-conducting electrochemically active compound, as generally used for anodes.

Particularly to be mentioned are lithium, lithium containing alloys, micronized carbon black, natural and synthetic graphite, synthetically graphitized carbon dust and carbon fibers, oxides, such as titanium, zink, tinn, molybdenum, wolframoxide, carbonates, such as titanium, molebdenum and zink carbonate.

Said at least one first layer alternatively used as a cathode or an anode additionally contains up to 20 wt-%, based on the total weight of said film of conducting carbon black.

Furthermore, the present invention relates to a composite, which may be in particular used in electrochemical cells, preferably in the form of a film, more preferably in the form of a film having a total thickness of 15 to 1.500 microns, especially having a total thickness of 50 to 500 microns, comprising at least one first layer comprising an electron conducting electrochemical active compound, and at least one second layer being free of an electron-conducting electrochemically active compound, the latter layer comprising the mixture according to the invention.

Furthermore, the present invention describes a process for the preparation of such an composite comprising the following steps:

(I) Preparing at least one first layer, as defined above;
(II) Preparing at least one second layer, as defined above; and
(III) subsequently combining the at least one first layer and the at least one second layer by a commonly used coating process.

Preferably, the at least one second layer is prepared on a temporary support. According to the invention, there may be used commonly used temporary supports, such as a separation film of a polymer or a preferably coated paper, such as a siliconized polyester film. The preparation of this second layer may be also conducted on a permanent support, such as a discharge electrode, or without any support.

Combining and preparation, respectively, of the above defined layers may be achieved by pressureless processes for coating or preparing films, such as pouring or knife coating, as well as by processes under pressure, such as extruding.

Such a composite may be filled with the electrolyte and the conducting salt either before combining the layers or, preferably, after combining the layers, optionally after contacting the same with suitable discharge electrodes, e.g. a metal film, and may be even carried out after introducing the composite in a battery housing, whereby the specific microporous structure of the layers achieved by using the mixture according to the invention, particularly attributed to the presence of the above defined solid in the separator and optionally in the electrodes, allows the soaking of the electrolyte and the conducting salt and the displacement of the air being present in the pores. The filling may be conducted at temperatures ranging from 0 C. to about 100° C., depending on the used electrolyte.

Furthermore, the present invention relates to an electrochemical cell which comprises a membrane or a composite as respectively defined above.

Furthermore, it relates to the use of the membrane as defined herein as a separator in electrochemical cells.

As outlined above, the present invention provides a membrane to be suitably used in particular as a separator in electrochemical cells which has the following desired characteristics:

1. The lithiumion-transfer through the membrane according to the invention is considerably good;
2. The membrane according to the invention is heat-stable and exhibits no shrinkage below 200° C.;
3. The membrane may be bended by 180° without causing any damages to said membrane, which is particularly important for prismatic cells, i.e. those of the rectangular type, in which these membranes may be particularly suitably used as separators;
4. The membrane as provided has also elastic properties and thus is able to keep good contact with anode and/or cathode;
5. The membrane may be heat laminated on a cathode or anode surface, which ensures the desired good contact between these surfaces and the membrane according to the invention;
6. Even after electrolyte immersion, the mechanical strength of the membrane according to the invention is very good;
7. The production of said membrane is to be regarded as to be very economically;
8. The membrane according to the invention has a good wettability for electrolyte solutions.

In the following, the invention will be now explained in more detail with respect to the following examples.

EXAMPLES

General Procedure for Making Cast Films 20 g Wollastonite (Tremin 283-600MST, Quarzwerke French) with an average particle size of 3 microns, which has been surface treated with a silane cuppling agent and whose aqueous suspension has a pH-value of 8.5 is dispersed by a high speed stirrer in 100 g of THF (tetrahydrofuran). To this mixture, 9.0 g of a thermoplastic polyurethane elastomer (Elastollan 680-50, Takeda Badische Urethane Ltd.: polyester type, JIS A hardness 80 A) was added and dissolved at 55° C. under agitation.

The mixture was then applied, using a doctor blade with a coating gap of 390 microns, to a silicone-treated PET film at 50° C., the diluent was removed within 15 minutes, and the obtained film is dried in a vacuum oven for 1 h at 110° C.

Battery Test (a) Assembly of a Cell

A flat cell (HS cell by Hohsen Corp.) was used (positive electrode and negative electrode; 16 mm diameter, and separator: 20 mm diameter). The negative electrode (graphite was coated on copper film) is placed in the bottom of HS cell and a separator was put on this negative electrode to cover the whole negative surface area, and Teflon spacer (guide) was put on these in order to fix them. Then a positive electrode ($LiCoO_2$ was coated on aluminum layer) was put in a hole of the Teflon spacer, and a push plate is put into a hole of Teflon guide and subsequently the electrolyte solution (1 mol $LiPF_6$ in 1 liter EC/MEC solvent (EC/MEC=4/6; EC=ethylene carbonate; MEC=methylethyl carbonate)) was fed. After setting on upper flange, a spacer lod and a spring, this cell was placed in a vacuum chamber and vacuum-treated twice in order to remove the remaining gas in the cell. After setting the closing cap, the charge/discharge capacity and cycle capability of the prepared cell was tested by using a Toyo System's battery tester. The whole operation is done in Argon atmosphere in a glove box (MBRAUN's MB 200MOD).

(b) Charge/discharge Test and Cycle Test

Toscat-3100 system (TOYO SYSTEM CO.LTD) was used for charge/discharge test and cycle test.

First the cell is pre-charged up to 3.8 V for 50 min. Constant current and constant voltage method (CC/CV method) was used for charging 5 mA current (2.5 $mA/cm^2$). It was charged until the voltage of the cell reaches 4.1 volt and the charging is continued keeping this voltage. The total charging time was 3 hours.

Constant current discharge method was used for discharging. The end point is 2.75 V. Discharge test was done by changing current density (discharge current is 1 mA, 2.5 mA, 5 mA and 10 mA twice respectively), then 12 cycle tests were done by 5 mA discharging current.

Mechanical Test (a) Preparation of Specimen

Test specimen (dimension: 15*200 mm) were cut from casting films. The thickness of films was measured by a digimatic indicator (Mitsutoyo Co. type ID-C112C).

(B) Tensile Test

Strograph E-L (Toyoseiki) was used as a tensile tester, using a cross head speed of 30 mm/min. Tensile strength at break and elongation at break were measured.

In case of wet state by electrolytes: A droplet of electrolyte solution ($LiClO_4$+1 ml/l solvents (ethylene carbonates and diethylcarbonate mixture (EC/DEC= 4/6 molar ratio)) was put on a center of test specimen and kept for 30 min, and the tensile strength was measured.

Temperature Stability

A 50*80 mm cast film was kept for 1 h in an oven of definite temperature, then after cooling down, dimension was measured and shrinkage degree was calculated [(Heat shrinkage (%)=(length before heat treatment−length after heat treatment)/length before heat treatment)*100].

The films according to the following examples were in principle prepared according to the "procedure to make casting films" and tested with respect to their performance as outlined above, respectively.

The exact compositions and the results of the measurements carried out with the herein under described examples 1 to 11 may be deduced from Table 1.

Example 1

This example was in principle prepared according to the "procedure to make casting films" as outlined above, wherein Tremin 283 was used as a filler and Elastollan 680-50 was used as the thermoplastic polyurethane elastomer.

The temperature stability of the obtained film was measured and compared with a conventional separator on the basis of a polyolefin (Celgard 2300 (Hoechst Cellanese)). The results are shown in the following table 2.

TABLE 2

| | 90° C. | 110° C. | 120° C. | 150° C. | 170 | 190 | 200° C. |
|---|---|---|---|---|---|---|---|
| Celgard (polyolefin separator) #2300 | 5.0% | 16.8% | 27.5% | 39% | melt down | melt down | melt down |
| film of example 1 | nil. | Nil. | nil. | nil. | nil. | nil. | nil. |

TABLE 1

Summary of examples

| | example 1 | example 2 | example 3 | example 4 | example 5 | example 6 | example 7 | example 8 | example 9 | example 10 | example 11 |
|---|---|---|---|---|---|---|---|---|---|---|---|
| casting composition (g) | | | | | | | | | | | |
| THF | 100 | 100 | 100 | 100 | 100 | 100 | 100 | 30 | 100 | 100 | |
| DMF (dimethyl formamide) | | | | | | | | 86 | | | |
| propylene carbonate | | | | | | | | | 18.4 | | |
| Wollastonite (Tremin 283-600MST) | 20 | 10 | 37.1 | 50 | 32.5 | | | 32.5 | 32.5 | 32.5 | |
| Aerosil R974 | | | | | 0.63 | | | 0.63 | 0.63 | 0.63 | |
| ground calcium carbonate (Whiton P-30/Shiraishi Kogyo) | | | | | | 20 | | | | | |
| $Al_2O_3$ (Wako Pure Chemical) | | | | | | | 20 | | | | |
| Elastollan 680-50 | 9 | 9 | 9 | 9 | 4.5 | 9 | 9 | | | | |
| Elastollan 690-50 | | | | | | | | 9.6 | | | |
| Elastollan 1180-10 | | | | | | | | | 8.82 | | |
| Elastollan S80A-50 | | | | | | | | | | | 9 |
| Kynar 2801 | | | | | 4.5 | | | | | | |
| Cast film property | | | | | | | | | | | |
| thickness (micrometer) | 20 | 18 | 40 | 30 | 38 | 21 | 23 | 23 | 23 | 30 | |
| tensile strength at break ($N/mm^2$) | 6.1 | 7 | 3.3 | 3.1 | 3.9 | 5.2 | 3 | 3.1 | 2.8 | 3.7 | |
| elongation at break (%) | 214 | >200 | 27 | 27 | 8.7 | 65 | 170 | 5.1 | 15 | 35 | |
| Battery test results | | | | | | | | | | | |
| charging capacity at $2^{nd}$ cycle (mAh) | 5.91 | 5.89 | 5.94 | 5.8 | 5.95 | 5.87 | 6 | 5.92 | 5.78 | 5.86 | 5.92 |
| discharging capacity at 1 mA (mAh) | 5.81 | 5.63 | 5.84 | 5.76 | 5.88 | 5.76 | 5.9 | 5.84 | 5.69 | 5.77 | 5.84 |
| discharging capacity at 5 mA (mAh) | 5.75 | 5.43 | 5.89 | 5.64 | 5.76 | 5.63 | 5.73 | 5.81 | 5.6 | 5.23 | 5.49 |
| discharge capacity at $20^{th}$ cycle (mAh) | 5.54 | 5.17 | 5.67 | 5.46 | 5.52 | 5.43 | 5.31 | 5.68 | 5.45 | 5.45 | 5.04 |
| discharging capacity at 10 mA (mAh) | 5.1 | | 4.8 | 5.2 | 5.16 | | | | | | |
| discharge capacity after 100 cycles (mAh) | 5.4 | | 5.2 | | 5.18 | | | | | | |

Mechanical strength of the obtained membrane at wet state by electrolyte was measured and is shown in table 3.

TABLE 3

|  | Tensile force at break | elongation at break |
|---|---|---|
| membrane for example 1 | 0.78 N | 40 mm |

Air resistance of the obtained membranes according to examples 1 and 2 were measured and compared with a polyolefin separator (Celgard # 2300). The air resistance (Gurley) was measured according to ISO 5636/5:1996 Paper and board-determination of air permeance (medium range) —part 5: Gurley method.

Results are shown in table 4.

TABLE 4

|  | air resistance (seo/100 ml air) |
|---|---|
| Membrane from example 1 | >>42000 |
| Celgard #2300 | 490 |

Example 2 to 4

These examples were carried out in accordance with example 1, however by changing the content of Tremin, as becomes apparent from Table 1.

Example 5

Within this example a mixture between a polyvinylidenedifluoride-copolymer (Kynar 2801 from Atochem) and the thermoplastic polyurethane elastomer used in example 1 in a weight ratio of 1:1 and Aerosil R874 (Degussa: Hydrpophobic surface treated $SiO_2$ having an average diameter of 0.012 micron) were used as the starting materials to prepare a film according to the preparation method disclosed herein.

Example 6

Example 6 was manufactured in accordance with example 1 by using $Al_2O_3$ (Wako pure Chemical; average diameter: 1.0 microns) as a filler instead of Tremin 283.

Example 7

Example 7 was also prepared in accordance with example 1 by using Whiton P-30 (Shiraishi Kogyo; ground calcium carbonate; average diameter: 4.3 micron) as a filler instead of Tremin 283.

Example 8

In example 8, a different thermoplastic polyurethane elastomer Elastollan 690-50, which exhibits a higher shore A hardness of 90 compared to the Elastollan 680 as used in example 1 was used. Furthermore, the solvent composition was changed, as may be seen from table 1. Apart from these differences, also this example was manufactured in accordance with example 1.

Example 9

Also this example was prepared in accordance with example 1 by using a thermoplastic polyurethane of the polyether-type comprising poyltetramethylene glycol as a soft segment as being commercially available under the trade name Elastollan 1180A10.

Example 10

This example was also prepared in accordance with example 1 by using a thermoplastic polyurethane of the polyester-type as being commercially available under the trade name Elastollan S 80 A-50.

Example 11

The film of example 1 was heat-laminated on a negative electrode at 160° C. by using a IBICO-laminator (IL-12 HR/IBICO PTE LTD) and battery test were carried out as outlined earlier herein before. The negative electrode was prepared as follows:

400 mg of MCMB (Osaka Gas), 35 g of Kynar® 2801 (Elf Atochem), 35.6 g of ethylene carbonate and 35.6 g of dimethyl carbonate were added to 460 g of THF. This mixture was ground for several days and then applied to a copper film previously coated with an adhesive coating. After drying, this film was used as anode film for this example.

With respect to the composition of the thermoplastic polyurethane elastomers used in the above examples, we refer to table 5 herein under, which specifies the compositions of the thermoplastic polyurethane elastomers used herein.

TABLE 5

TPU (thermoplastic polyurethane elastomers) used in this patent application

| Grade Name | Supplier | Soft segments (polydiols) | chain extender | diisocyanate | Hardness (Shore A) |
|---|---|---|---|---|---|
| Elastollan 680-50 | Takeda Badische Urethane Industry Ltd. | Polybuthylene adipate | 1,4 butanediol | diphenylmethane diisocyanate | 80–82 |
| Elastollan 690-50 | Takeda Badische Urethane Industry Ltd. | Polybuthylene adipate | 1,4 butanediol | diphenylmethane diisocyanate | 90–92 |
| Elastollan S80A50 | Elastogran GmbH | Poly(ethylene/buthylene) adipate | 1,4 butanediol | diphenylmethane diisocyanate | 80–82 |
| Elastollan 1180A10 | Elastogran GmbH | Polytetramethylene glycol | 1,4 butanediol | diphenylmethane diisocyanate | 80–82 |

In case of examples 1, 3 and 5, long cycle test were performed. For said purpose, a 100 cycle (charge and discharge current: 5 mA) tests was carried out after usual charge/discharge test and a cycle tests. Within these tests, the charge and discharge characteristics of the membrane according to these examples maintained in a satisfactory range showing the excellent performance of the membrane according to the invention.

We claim:

1. A membrane consisting of a composition including
    (a) 10 to 90 wt-% of at least one polyurethane elastomer comprising at least one hard segment and at least one soft segment, and
    (b) 90 to 10 wt-% of a solid,
wherein said solid is incorporated in said at least one polyurethane elastomer, and said solid is an inorganic Li-ion-conducting solid selected from the group consisting of lithium borates, lithium aluminates, lithium aluminosilicates, lithium zeolites, lithium carbides, lithium oxides, lithium mixed oxides, $Li_2NH$, $LiNH_2$, lithium phosphates, $Li_2CO_3$, lithium silicates in the form of ladder-type, ino-, phyllo- and tectosilicates, lithium sulfates and mixtures thereof.

2. A membrane according to claim 1, wherein the at least one polyurethane elastomer is a thermoplastic polyurethane elastomer.

3. Membrane according to claim 1, wherein the solid has a primary particle size of 0.005 to 30 microns.

4. Membrane according to claim 1, wherein the polyurethane elastomer has at least one of the following characteristics:
    (a) a melting point of the hard segment of more than 100° C., and
    (b) the soft segment comprises ether linkages, ester linkages or carbonate linkages or a combination of two or more thereof.

5. Membrane according to claim 1, wherein the polyurethane elastomer contains at least two thermoplastic, nonelastic polymer blocks having a melting temperature above 100° C. and an average molecular weight of 240 to 10,000 (hard segment) and between said thermoplastic, nonelastomeric polymer blocks an elastomeric block having a glass transition temperature below 10° C. and an average molecular weight of about 240 to 100,000.

6. Membrane according to claim 1, wherein
    the lithium borates are selected from the group consisting of $Li_4B_6O_{11}*$ $xH_2O$, $Li_3(BO_2)_3$, $Li_2B_4O_7*xH_2O$, $LiBO_2$, where x can be a number from 0 to 20;
    the lithium aluminates are selected from the group consisting of $Li_2O*$ $Al_2O_3*H_2O$ and $Li_2Al_2O_4$ and $LiAlO_2$;
    the lithium aluminosilicates are selected from the group consisting of lithium-containing zeolites, feldspars, feldspathoids, phyllo- and ino-silicates, $LiAlSi_2O_6$ (spodumene), $LiAlSi_4O_{10}$ (petullite), $LiAlSiO_4$ (eucryptite), and micas;
    the lithium zeolites have a fiber-like, sheet-like or cube-like form and have the formula $Li_{2/z}O*Al_2O_3*xSiO_2*yH_2O$ where z corresponds to the valence, x is from 1.8 to about 12 and y is from 0 to about 8;
    the lithium carbides are selected from the group consisting of $Li_2C_2$, $Li_4C$; $Li_3N$;
    the lithium oxides and lithium mixed oxides are selected from the group consisting of $LiAlO_2$, $Li_2MnO_3$, $Li_2O$, $Li_2O_2$, $Li_2MnO_4$ and $Li_2TiO_3$;
    the lithium phosphates are selected from the group consisting of $Li_3PO_4$, $LiPO_3$, $LiAlFPO_4$, $LiAl(OH)PO_4$, $LiFePO_4$ and $LiMnPO_4$;
    the lithium silicates are selected from the group consisting of $Li_2SiO_3$, $Li_2SiO_4$, $Li_2S$—$SiS_2$ and mechanically milled products from $Li_2S$, $SiS_2$ and $Li_4SiO_2$; and
    the lithium sulfates are selected from the group consisting of $Li_2SO_4$, $LiHSO_4$, and $LiKSO_4$.

* * * * *